United States Patent
Gandhi et al.

(10) Patent No.: US 10,296,092 B2
(45) Date of Patent: May 21, 2019

(54) GENERATING HAPTIC EFFECTS WHILE MINIMIZING CASCADING

(71) Applicant: Immersion Corporation, San Jose, CA (US)

(72) Inventors: Kanav Gandhi, Sunnyvale, CA (US); Stephen D. Rank, San Jose, CA (US); Henry Da Costa, Montreal (CA); Eric Gervais, Montreal (CA); Daniel Parker, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 50 days.

(21) Appl. No.: 15/338,978

(22) Filed: Oct. 31, 2016

(65) Prior Publication Data
US 2017/0045945 A1    Feb. 16, 2017

Related U.S. Application Data (63) Continuation of application No. 14/943,179, filed on Nov. 17, 2015, now Pat. No. 9,507,423, which is a
(Continued)

(51) Int. Cl.
*G08B 6/00*    (2006.01)
*G06F 3/01*    (2006.01)

(52) U.S. Cl.
CPC ............ *G06F 3/016* (2013.01); *G08B 6/00* (2013.01)

(58) Field of Classification Search
CPC .. G06F 3/016; G06F 3/0488; G06F 2203/013; G06F 2203/014; G06F 2203/015; G06F 3/0362; G06F 3/044; G06F 3/165; G06F 15/0291; G06F 1/1626; G06F 1/1684; G06F 2203/04809; G06F 3/0483; G06F 3/04883; G08B 6/00; G10H 1/0008; G10H 1/0066; G10H 2220/311; G10L 21/06; A63F 13/23; A63F 13/285; A63F 13/54; A63F 13/22; A63F 13/60; A63F 2300/302; H04L 25/4902

USPC ............. 340/426.12, 426.14, 426.2, 426.21, 340/426.24, 566, 648, 691.2, 340/407.1–407.2, 515–516, 428–429
See application file for complete search history.

(56) References Cited

U.S. PATENT DOCUMENTS

| | | |
|---|---|---|
| 5,889,670 A | 3/1999 | Schuler et al. |
| 5,889,672 A | 3/1999 | Schuler et al. |

(Continued)

FOREIGN PATENT DOCUMENTS

EP    2624100 A1    5/2013

OTHER PUBLICATIONS

Michael Levin et al.; "Tactile-Feedback Solutions for an Enhanced User Experience"; Information Display, Palisades Institute for Research Services; New York, U.S.; No. 10., Jan. 1, 2009; pp. 18-21; XP007915375.

*Primary Examiner* — Daniel Previl
(74) *Attorney, Agent, or Firm* — Miles & Stockbridge P.C.

(57) ABSTRACT

A system that generates haptic effects using an actuator receives a haptic effect definition that defines a haptic effect. The system pre-processes the haptic effect definition by determining if the actuator is capable of playing the haptic effect. The system then post-processes the haptic effect definition by adjusting a force value based on an estimate or measurement of a state of the actuator during a playing of the haptic effect.

20 Claims, 5 Drawing Sheets

Related U.S. Application Data continuation of application No. 14/048,374, filed on Oct. 8, 2013, now Pat. No. 9,213,408.

(56) References Cited

U.S. PATENT DOCUMENTS

| | | |
|---|---|---|
| 5,959,613 A | 9/1999 | Rosenberg et al. |
| 6,088,017 A | 7/2000 | Tremblay et al. |
| 6,275,213 B1 | 8/2001 | Tremblay et al. |
| 6,278,439 B1 | 8/2001 | Rosenberg et al. |
| 6,424,333 B1 | 7/2002 | Tremblay et al. |
| 6,801,008 B1 | 10/2004 | Jacobus et al. |
| 6,876,891 B1 | 4/2005 | Schuler et al. |
| 7,050,955 B1 | 5/2006 | Carmel et al. |
| 7,209,117 B2 | 4/2007 | Rosenberg et al. |
| 7,218,310 B2 | 5/2007 | Tierling et al. |
| 7,369,115 B2 | 5/2008 | Cruz-Hernandez et al. |
| 7,639,232 B2 | 12/2009 | Grant et al. |
| 7,656,388 B2 | 2/2010 | Schena et al. |
| 7,765,333 B2 | 7/2010 | Cruz-Hernandez et al. |
| 7,821,493 B2 | 10/2010 | Tierling et al. |
| 7,843,277 B2 | 11/2010 | Gregorio et al. |
| 8,098,234 B2 | 1/2012 | Lacroix et al. |
| 8,232,969 B2 | 7/2012 | Grant et al. |
| 9,213,408 B2 * | 12/2015 | Gandhi ............ G08B 6/00 |
| 9,367,136 B2 | 6/2016 | Latta et al. |
| 9,370,459 B2 | 6/2016 | Mahoney |
| 9,370,704 B2 | 6/2016 | Marty |
| 9,392,094 B2 | 7/2016 | Hunt et al. |
| 9,462,262 B1 | 10/2016 | Worley, III et al. |
| 9,507,423 B2 * | 11/2016 | Gandhi ............ G08B 6/00 |
| 9,626,805 B2 | 4/2017 | Lampotang et al. |
| 9,645,646 B2 | 5/2017 | Cowley et al. |
| 9,652,037 B2 | 5/2017 | Rubin et al. |
| 9,760,166 B2 | 9/2017 | Ammi et al. |
| 9,811,854 B2 | 11/2017 | Lucido |
| 9,851,799 B2 | 12/2017 | Keller et al. |
| 9,933,851 B2 | 4/2018 | Goslin et al. |
| 9,948,885 B2 | 4/2018 | Kurzweil |
| 2003/0025595 A1 | 2/2003 | Langberg |
| 2006/0038781 A1 | 2/2006 | Levin |
| 2007/0202841 A1 | 8/2007 | Cruz-Hernandez et al. |
| 2007/0236449 A1 | 10/2007 | Lacroix et al. |
| 2008/0132313 A1 * | 6/2008 | Rasmussen ............ G07F 17/32 463/16 |
| 2008/0198139 A1 * | 8/2008 | Lacroix ............ G06F 3/016 345/173 |
| 2008/0223627 A1 | 9/2008 | Lacroix et al. |
| 2009/0313542 A1 * | 12/2009 | Cruz-Hernandez ..... G06F 3/016 715/702 |
| 2012/0249462 A1 * | 10/2012 | Flanagan ............ G06F 1/1694 345/173 |
| 2013/0106589 A1 * | 5/2013 | Posamentier ............ G06F 3/016 340/407.1 |
| 2014/0232646 A1 * | 8/2014 | Biggs ...................... G06F 3/016 345/156 |
| 2014/0272867 A1 | 9/2014 | Ratcliffe et al. |
| 2016/0070348 A1 | 3/2016 | Cowley et al. |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Bray et al. |
| 2016/0169635 A1 | 6/2016 | Hannigan et al. |
| 2016/0170508 A1 | 6/2016 | Moore |
| 2016/0171860 A1 | 6/2016 | Hannigan et al. |
| 2016/0171908 A1 | 6/2016 | Moore et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |

* cited by examiner

GENERATING HAPTIC EFFECTS WHILE MINIMIZING CASCADING

CROSS-REFERENCE TO RELATED APPLICATIONS

This application is a continuation of U.S. patent application Ser. No. 14/943,179, filed on Nov. 17, 2015, which is a continuation of U.S. patent application Ser. No. 14/048,374, filed on Oct. 8, 2013, which issued as U.S. Pat. No. 9,213,408. The disclosure of each of these applications is hereby incorporated by reference.

FIELD

One embodiment is directed generally to haptic effects, and in particular to generating haptic effects using an actuator.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects." Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, such as cellular telephones, smartphones, portable gaming devices, and a variety of other portable electronic devices. For example, some portable gaming applications are capable of vibrating in a manner similar to control devices (e.g., joysticks, etc.) used with larger-scale gaming systems that are configured to provide haptic feedback. Further, devices such as smartphones use haptic effects to cause "buttons" on a touchscreen to feel like their mechanical counterparts when selected by a user.

In order to generate vibration effects, many devices utilize some type of actuator/motor or haptic output device. Known actuators used for this purpose include an electromagnetic actuator such as an Eccentric Rotating Mass ("ERM") actuator in which an eccentric mass is moved by a motor and rotates around an axis of rotation. However, because of inertia, the mass in an ERM takes time to get up to the desired rotation speed, and time to wind back down. This "spin up" and "spin down" time can cause latency in the generation of vibratory type haptic effects, and can degrade the "feeling" of haptic effects. In particular, multiple haptic effects that are generated within a short span of each other, such as in response to multiple "keypad" presses, can "cascade" or pile up into a continuous "buzz" due to the latency with slow, inexpensive ERMs.

SUMMARY

One embodiment is a system that generates haptic effects using an actuator. The system receives a haptic effect definition that defines a haptic effect. The system pre-processes the haptic effect definition by determining if the actuator is capable of playing the haptic effect. The system then post-processes the haptic effect definition by adjusting a force value based on an estimate or measurement of a state of the actuator during a playing of the haptic effect.

DETAILED DESCRIPTION

One embodiment is a system and drive circuit for an ERM actuator that tunes, pre-processes, and post-processes a haptic effect definition in order to account for actuator properties and minimize cascading of multiple haptic effects. The pre-processing can scale the magnitude or other parameter of the haptic effect. The post-processing can generate a new magnitude based on actuator properties, current actuator state and the desired magnitude.

Figure 1:
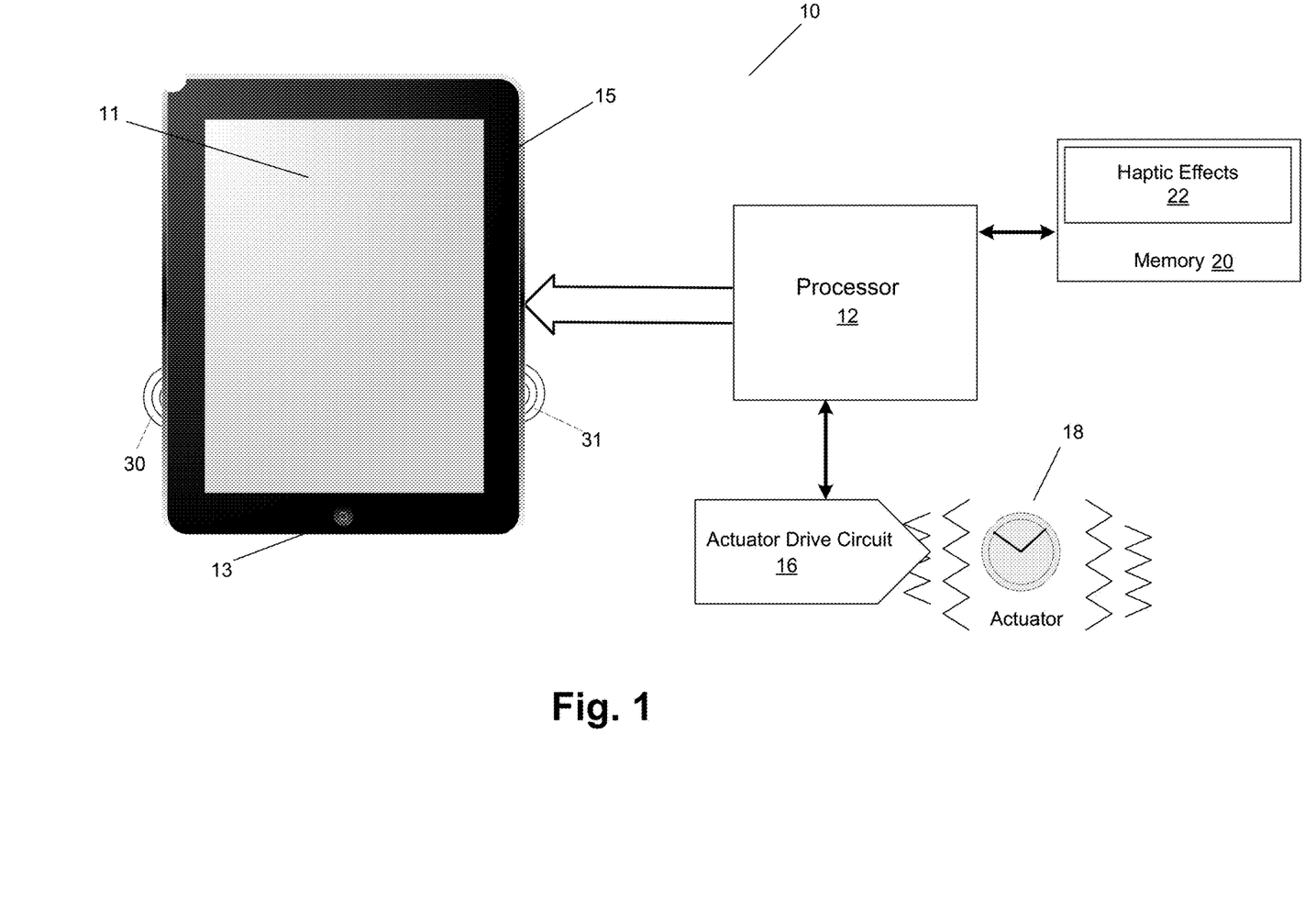
FIG. 1 is a block diagram of a haptically-enabled system in accordance with one embodiment of the present invention.

FIG. 1 is a block diagram of a haptically-enabled system 10 in accordance with one embodiment of the present invention. System 10 includes a touch sensitive surface 11 or other type of user interface mounted within a housing 15, and may include mechanical keys/buttons 13. Internal to system 10 is a haptic feedback system that generates vibrations 30, 31 on system 10. In one embodiment, the vibrations are generated on touch surface 11. In various embodiments, not all elements shown in FIG. 1 are required for implementation.

The haptic feedback system includes a processor or controller 12. Coupled to processor 12 is a memory 20 and an actuator drive circuit 16, which is coupled to an actuator 18. Actuator 18 can be any type of actuator, including an actuator with a rotating mass, and in one embodiment is an Eccentric Rotating Mass ("ERM") actuator. In one embodiment, actuator 18 is any type of actuator that has relatively long rise and fall times. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to actuator drive circuit 16, which includes electronic components and circuitry used to supply actuator 18 with the required electrical current and voltage (i.e., "motor signals") to cause the desired haptic effects. System 10 may include more than one actuator 18, and each actuator may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12. Among the instructions, memory 20 includes a haptic effects module 22 which are instructions that, when executed by processor 12, generate drive signals for actuator 18 that provide haptic effects while minimizing cascading, as disclosed in more detail below. Memory 20 may also be located internal to processor 12, or any combination of internal and external memory.

Touch surface 11 recognizes touches, and may also recognize the position and magnitude of touches on the surface. The data corresponding to the touches is sent to processor 12, or another processor within system 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, dials, etc., or may be a touchpad with minimal or no images.

System 10 may be a handheld device, such a cellular telephone, personal digital assistant ("PDA"), smartphone, computer tablet/pad, gaming console, etc., or may be any other type of device that includes a haptic effect system that includes one or more actuators. System 10 may also be a wearable device (e.g., a bracelet, armband, glove, jacket, vest, pair of glasses, shoes, belt, etc.) that includes one or more actuators that generate haptic effects. The user interface may be a touch sensitive surface, or can be any other type of user interface such as a mouse, touchpad, mini-joystick, scroll wheel, trackball, game pads or game controllers, etc. In embodiments with more than one actuator, each actuator may have a different rotational capability in order to create a wide range of haptic effects on the device.

As discussed above, when playing vibratory haptic effects on actuators that have a high rise and fall times, such as ERMs or other types of slow motors, there is typically some latency. Therefore, when playing a series of quick haptic effects, such as in response to consecutive pressing of virtual keys of a touchscreen keyboard, a continuous buzz may be generated, which is referred to as "cascading". Cascading is caused by the motor not coming to a stop after playing a first effect when it receives a subsequent effect. Ultimately, the motor is spinning continuously, and the user cannot feel the individual haptic effects when they are played within a short span of each other. Known solutions to the cascading problem include using relatively expensive ERMs that have a quicker rise and fall time, using a relatively expensive drive circuit that supports bidirectional drive signals that include braking signals, or somehow preventing the effects from being played so quickly.

Embodiments include a pre-processing and post-processing of the haptic effect signal in order to accommodate slow rise and fall times of the actuator and eliminate or minimize cascading. Before the pre-processing and post-processing, embodiments "tune" the actuator in order to characterize the actuator rise time and fall time and to account for variations in those times. Some embodiments may implement the pre-processing or post-processing alone to minimize or eliminate cascading. Other embodiments will implement both the pre-processing and post-processing to minimize or eliminate cascading.

Specifically, slow actuators have non-linear rise and fall characteristics. To be able to model such actuators, embodiments measure the total rise time taken for the actuator to rise from rest to 90% of rated acceleration. This rise time region in one embodiment is then divided into 10 segments at 10%, 20% . . . 90% of the rise time and the corresponding acceleration at each point is noted. These 9 values+the total rise time are added to the tuning parameters. In general, any number of points/segments can be selected, and the more points taken along the rise curve, the more accurate the model. Each actuator on a device has its own set of 99 tuning parameters in one embodiment. Changing these parameters results in different haptic effects. Examples of tuning parameters include: (1) a gain value for scaling magnitudes; (2) linearization values which help to get a linear response from a non-linear actuator; (3) MagSweep effect kick and brake parameters; (4) Periodic effect parameters; (5) update rate (e.g., 5 ms); and (6) informational parameters such as actuator type, build number, etc.

Similarly to the rise curve, 10 values are obtained for the fall curve in one embodiment, although any number of values can be used. The fall time is considered to be the time required for an actuator to go from rated acceleration to below perceptible acceleration (~0.04 g in one embodiment). If braking is supported by the actuator, a negative overdrive voltage, or some other braking mechanism such as shunting, is applied. Otherwise, no voltage is applied. By applying this tuning model, embodiments have a more accurate picture of which effects a motor can play and also of the state of the motor at a given time.

Figure 2:
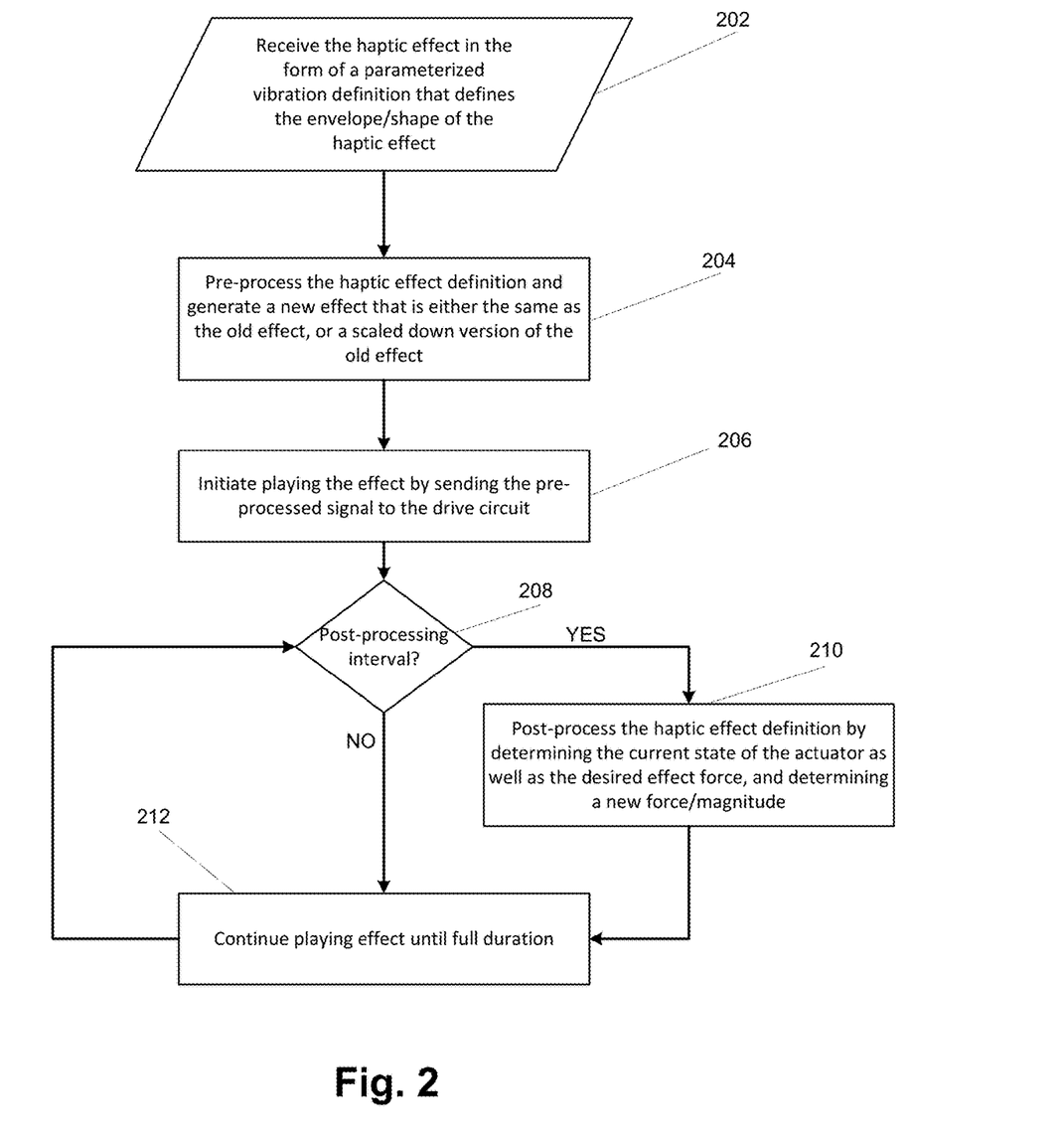
FIG. 2 is a flow diagram of the functionality of the system of FIG. 1 when generating haptic effects with minimal or no cascading in accordance with one embodiment of the present invention.

FIG. 2 is a flow diagram of the functionality of system 10 when generating haptic effects with minimal or no cascading in accordance with one embodiment of the present invention. In one embodiment, the functionality of the flow diagram of FIG. 2, and FIGS. 3 and 5 below, is implemented by software (e.g., haptic effects module 22) stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, the haptic effect is received in the form of a parameterized vibration definition that defines the envelope/shape of the haptic effect. The definition includes parameters that define the haptic effect, including duration, frequency, magnitude, etc. In one embodiment, the definition is in accordance with the "TouchSense® 3000 Haptic Design Kit" from Immersion Corp. In this embodiment, the haptic effect is defined by a definition shape formed by an envelope that includes three basis parts/regions or effect magnitudes: "impulse", "sustain" and "fade" that are formed from a MagSweep or Periodic basis effect. Other effect types such as Timelines and Interpolated effects are composed of basis effects. In other embodiments, the definition is in general of an effect that is relatively maintained throughout the functionality of FIG. 2.

At 204, the haptic effect definition is pre-processed. In general, the pre-processing revises the haptic effect to match the characteristics of actuator 18 within system 10 by determining the desired haptic effect and determining the actual effect the actuator is capable of playing based on its characteristics. The "new" effect is either the same as, or a scaled down version of, the original effect. For example, if the haptic effect definition is very strong for a short duration, the actuator may not be able to spin up so quickly. Therefore, the pre-processing modifies the haptic effect definition to accommodate the actuator, such as reducing the magnitude, before the haptic effect is played. In one embodiment, pre-processing includes "clipping" the effect based on the desired effect to be played and based on the actuator rise curve and/or fall curve. The clipping occurs at the basis effect level and ensures that the actuator can achieve the desired magnitude at the end of the effect's duration. Therefore, if the same effect is played repeatedly, the effects will not merge into each other, which prevents cascading. In general, the pre-processing modifies the effect in such a way that cascading is reduced or is impossible, while maintaining as much as possible the effect properties relative to each other. Other methods in addition to or instead of magnitude scaling can be used, including effect duration scaling. Additional details of the pre-processing is disclosed below.

At 206, the pre-processed haptic effect is initiated/played by sending the pre-processed signal to the drive circuit, which causes the actuator to create a vibratory haptic effect.

While the haptic effect is playing, at 208 it is determined if a post-processing interval has been reached. A post-processing interval is pre-determined and is typically equal to every timer/clock tick/cycle (e.g., every 5 ms) and occurs every time prior to having a force value sent to the drive circuit.

If no at 208, at 212 the haptic effect continues to be played until its full duration has expired and functionality continues at 208.

If yes at 208, at 210 the haptic effect definition is post-processed. In general, the post-processing estimates or measures where the actuator lies on its rise or fall curve at a given point (i.e., the actuator current state), and the force/voltage value sent to the actuator drive circuit is adjusted accordingly. The force value represents how fast the motor is desired to be spinning based on the effect definition at a particular time instant. The post-processing determines the current state of the actuator as well as the desired effect force, and determines a new force/magnitude. The new force may be the same as the desired force or it may be a force which will cause the actuator to achieve the desired force as soon as possible. The force value can be received from an external entity, such as the kernel from the "TouchSense® 3000 Haptic Design Kit" from Immersion Corp. The post-processing adjusts the force value based on an estimate or measurement about the current state of the actuator (i.e., how fast it is already spinning). Additional details of the post-processing are disclosed below.

At 212, the haptic effect, after being post-processed at 210, is played. Functionality continues at 208.

Figure 3:
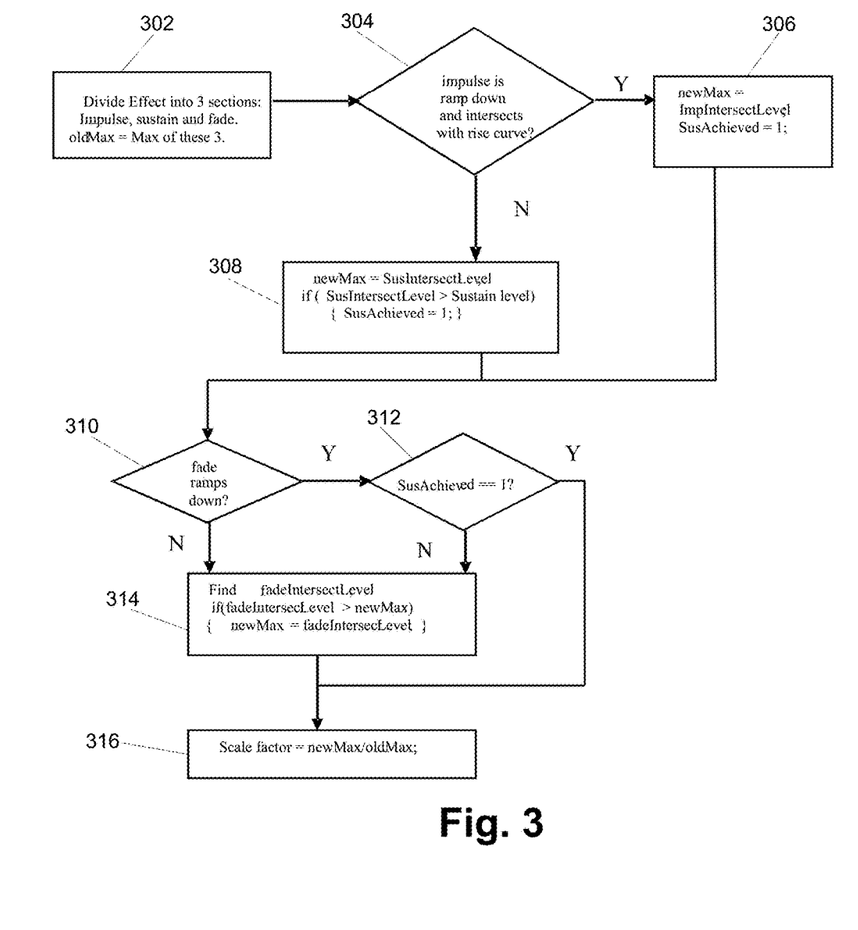
FIG. 3 is a flow diagram of the functionality of the system of FIG. 1 when pre-processing a haptic effect definition in accordance with one embodiment of the present invention when three effect regions are used.
Figure 4:
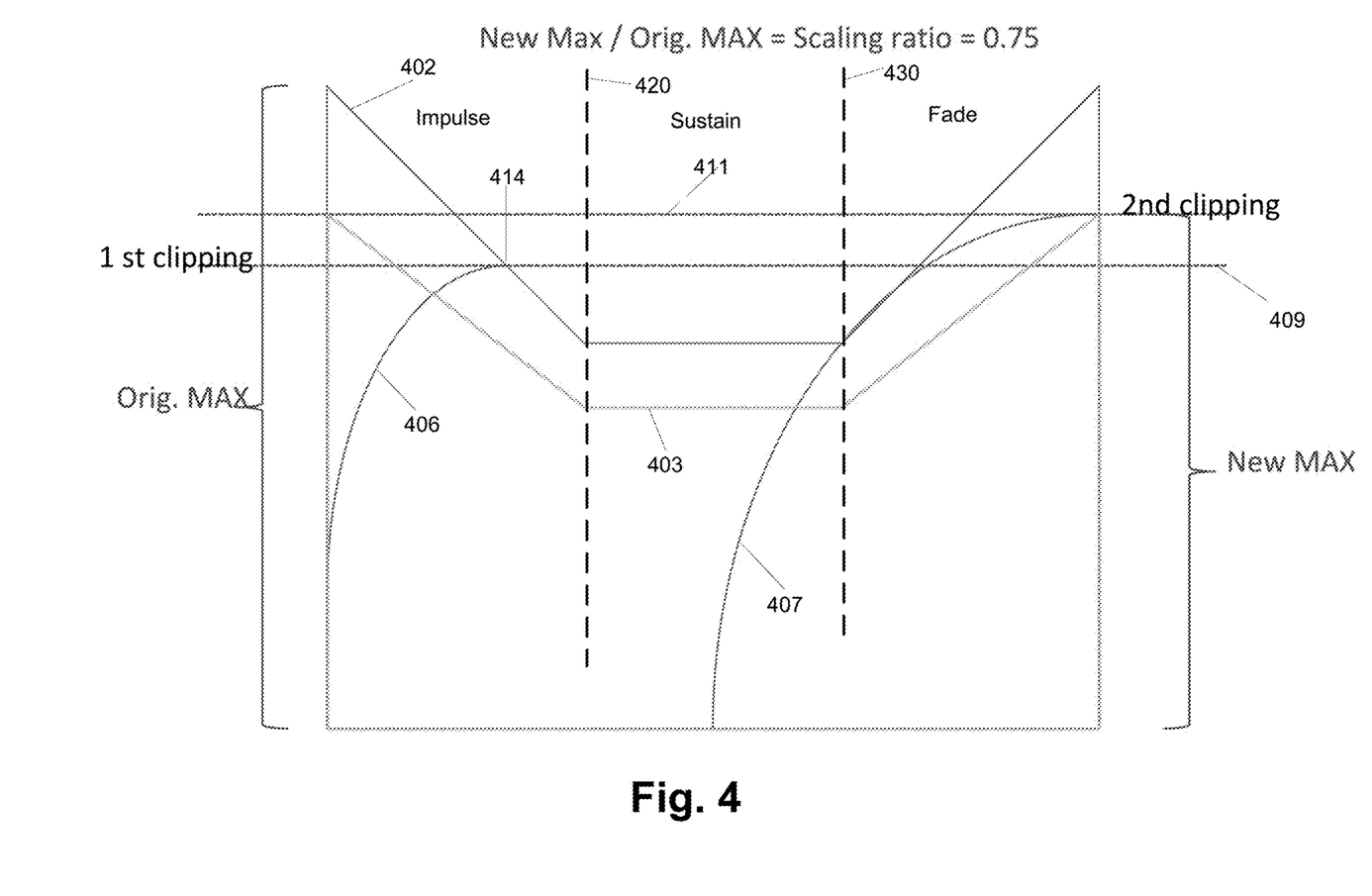
FIG. 4 illustrates an example effect that illustrates the functionality of FIG. 3 in accordance with one embodiment.

FIG. 3 is a flow diagram of the functionality of system 10 when pre-processing a haptic effect definition in accordance with one embodiment of the present invention when three effect regions are used. In general, for this embodiment, out of the three effect regions (i.e., impulse, sustain and fade) the maximum magnitude that the actuator can achieve ("new-Max") is determined. All three regions are then scaled using the ratio "newMax/oldMax". Therefore, the effect shape is maintained. FIG. 4 illustrates an example effect that illustrates the functionality of FIG. 3 in accordance with one embodiment.

Specifically, as shown in FIG. 3, at 302 the effect is divided into the three magnitude sections/region: impulse, sustain and fade. The impulse and fade regions can be flat or can ramp up or ramp down. The sustain region is always flat in one embodiment.

The variable "oldMax" equals the maximum magnitude among the three sections. In FIG. 4, the impulse section of the original effect 402 is the initial section and ends at 420. The next section is the sustain section that ends at 430. Finally, the fade section concludes the effect.

At 304, it is determined if the impulse section is a ramp down and intersects with the rise curve of the actuator. In FIG. 4, the impulse section does ramp down, and does intersect rise curve 406 at 414.

If yes at 304, at 306 the variable "newMax" equals the impulse intersection level and the variable "Susachieved" equals 1. In FIG. 4, the impulse intersection level is $1^{st}$ clipping 409.

If no at 304 (i.e., the impulse is ramp down), at 308 newMax equals the sustain intersection level of the rise curve. If the sustain intersection level is greater than the sustain level, then Susachieved equals 1. At 310, it is determined if the fade section ramps down. If yes at 310, at 312, it is determined if Susachieved equals 1. If Susachieved=1, functionality continues at 316.

If no at 310 or 312, at 314, the intersection level of the fade section and the rise curve is determined. If the rise curve does not intersect the fade section, fadeIntersectLevel is set to the max that the rise curve can achieve in the fade duration. If the intersection level is greater than newMax, the newMax is set to the intersection level. In FIG. 4, there is no intersection with curve 407, and the maximum is at a $2^{nd}$ clipping 411, which is greater than $1^{st}$ clipping 409.

At 316, a scale factor of newMax/oldMax is determined. The original effect is then scaled to a scaled effect based on the scale factor by multiplying all magnitude levels by the scale factor. In FIG. 4, the scale factor is 0.75, and the original effect 402 is scaled to the scaled effect 403.

As described above, the pre-processing scales the entire effect to something that the actuator can achieve, while maintaining the effect shape (or maintains the original effect). The functionality determines the maximum magnitude (referred to as "oldMax") out of the initial ramp, sustain and fade magnitudes. The functionality then finds the three magnitudes that are actually achievable based on where the actuator rise curves intersect the effect curves (i.e., "ImpIntersectLevel", "SusIntersectLevel" and "FadeIntersectLevel"). The newMax is the maximum of these three effect magnitudes. Finally a scale factor of newMax/oldMax is determined. All three effect magnitudes in the original effect are multiplied by this scale factor to come up with the new magnitudes.

In other embodiments, instead of clipping effect magnitudes, effect durations could be clipped. Further, both the effect duration and magnitude can be clipped. For this embodiment, a perpendicular line is drawn from the effect to the rise curve and the magnitude and duration at the point of intersection of the perpendicular line and the rise curve is used.

In another embodiment, the area under the effect curve is determined and that is used to play effects. This embodiment assumes that for really slow motors a user would not be able to tell the difference between different effect shapes. In another embodiment, the duration of the effect can be determined and a determination is made as to how fast the actuator can end up after that duration starting from zero if the effect were a maximum magnitude square pulse, then the effect magnitude, impulse level and fade level can be limited to that value. Further, an embodiment can have a separate clipping process for "Timeline" haptic effects. Periodic, Magsweep and Waveform effects can be placed in a Timeline to create complex effect sequences.

Figure 5:
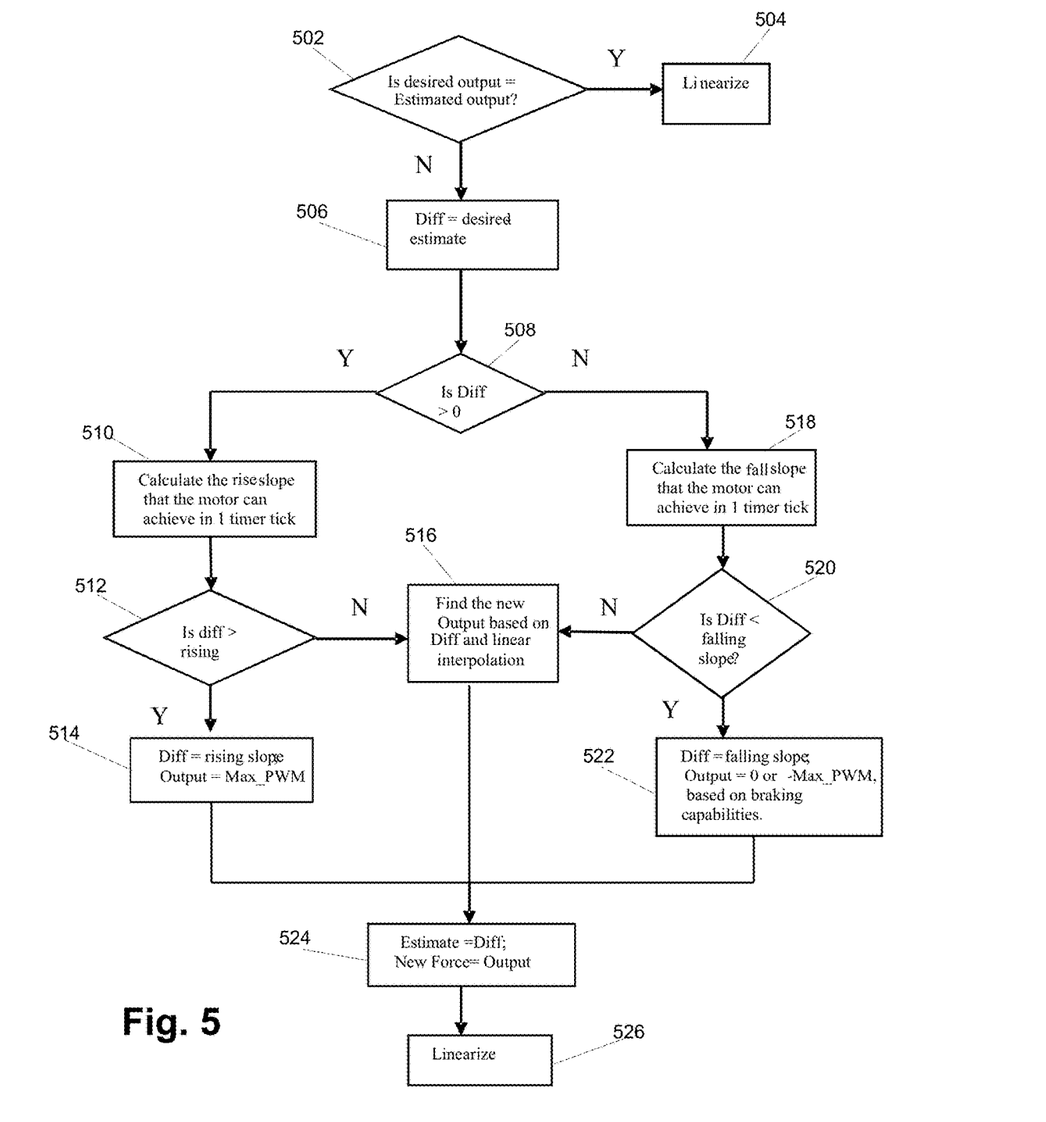
FIG. 5 is a flow diagram of the functionality of the system of FIG. 1 when post-processing a haptic effect definition in accordance with one embodiment of the present invention.

FIG. 5 is a flow diagram of the functionality of system 10 when post-processing a haptic effect definition in accordance with one embodiment of the present invention. In general, the post-processing functionality of FIG. 5 is executed on every timer tick/cycle, which is typically 5 ms. On each tick, embodiments determine the desired force and calculate the new force/voltage to send to the actuator (i.e., overdriving or braking partially to get the motor to spin at a desired speed). Embodiments determine how fast the motor should spin based on the haptic effect compared to how fast the motor can spin by taking into account an estimate of what the motor is currently doing in connection with where the actuator lies on it rise or fall curve. Embodiments compute a voltage that will get the motor to spin as closely as possible to the desired speed, and then update/re-compute the estimated speed, which might not be the same as the desired speed if the motor is incapable of reaching the desired speed in a timer tick.

At 502, it is determined if the desired force/output is equal to the estimated output. If yes at 502, the output is linearized at 504. Linearizing the output, in general, adds real world parameters such as friction, etc. to the output determination. For example, friction in the actuator may mean that 15% force is needed to generate a 1% force based haptic effect. In one embodiment, a table or other mapping is used for linearizing.

If no at 502, at 506 the variable "Diff" is determined as the desired output minus the estimated output.

At 508, it is determined if Diff is greater than zero.

If yes at 508, at 510 the rise time that the actuator can achieve in 1 timer tick is determined. In one embodiment, a lookup table based on the rise time slope of the actuator is used for the determination. The lookup table is generated based on the tuning functionality described above before the pre-processing. Once the lookup table is generated, it is used for pre-processing and post-processing.

At 512, it is determined if Diff is greater than the rising slope.

If yes at 512, at 514 Diff equals the rising slope and the output equals the maximum output of the actuator.

If no at 512, at 516 the new output is determined using linear interpolation between two points. Additional details regarding the linear interpolation is disclosed below. In other embodiments, any type of interpolation model can be used.

At 524, the Estimate equals Diff, and the New Force equals the output.

At 526, the output is linearized as in 504.

If Diff is not greater than 0 at 508, at 518 the fall slope that the actuator can achieve in 1 timer tick is determined. In one embodiment, a lookup table based on the fall time slope of the actuator is used for the determination.

At 520, it is determined if Diff is less than the falling slope.

If yes at 520, at 522 Diff equals the falling slope and the output equals 0 or the negative of the maximum power based on braking capabilities. Functionality then continues at 524.

If no at 520, functionality continues at 516.

As described above, for post-processing, the rise and fall curves of the actuator are divided into 10 linear segments based on the changes to the tuning process. The maximum increase/decrease in force values in a timer tick is determined, based on the slope of these line segments. The slope is used to determine if the actuator can get to the desired force value by the next timer tick. If not, a kick or brake pulse is applied. If the actuator can get to the desired force by the next time tick, the amount that the force should be increased/decreased is determined so that the actuator is at the desired force value by the end of the timer tick. The estimate force is updated every tick, as shown in FIG. 5.

In one embodiment, the post-processing can be implemented by the following pseudo-code in which parameter definitions are as follows:

Smax—maximum 'strength' representation; e.g., 63
  'Strength' means "effect designer intent"
Vmax—maximum voltage representation; e.g., 127
Ttick—update period; e.g., 5 ms
Vrat—rated voltage representation (<=Vmax)
Trise—time to go from 0 to Smax when applying Vmax
Tfall—time to go from Smax to 0 when applying -Vmax
The derived parameters are as follows:
Mmax—maximum strength-versus-time slope
  When applying Vmax
  The actuator can't accelerate any faster than this
  Mmax=Smax/Trise
  Mmax>0
Mmin—minimum strength-versus-time slope
  When applying -Vmax
  The actuator can't slow down any faster than this
  Mmin=-Smax/Tfall
  Mmin<0
The input is as follows:
Sdes—desired strength at time t+Ttick
  This is what the effect designer wants to feel
  Sdes>=0
The state variable is as follows:
Sest—estimated strength at time t
  This is what the simulation 'thinks' the user is feeling
  Sest>=0
The desired slope is as follows:
Mdes—This is the slope needed to go from Sest to Sdes in Ttick
  Mdes=(Sdes-Sest)/Ttick
The possible slope is as follows:
Clip Mdes to what the actuator can achieve
  Mout=MAX(MIN(Mdes,Mmax),Mmin)
The output voltage is as follows:
If Mout=0,
  Vout1=Vrat*Sest/Smax
  In order to maintain Sest
If Mout=Mmax,
  Vout2=Vmax
If Mout=Mmin,
  Vout2=-Vmax
Interpolate linearly
  Vout=Vout1+(Vout2-Vout1)*Mout/(Mout>=0 ? Mmax: Mmin)
Finally, the updated state is as follows:
Estimate state at time t+Ttick
  Sest'=Sest+Mout*Ttick As disclosed, embodiments generate haptic effects by pre-processing and/or post-processing a haptic effect definition. The pre-processing looks at the desired effect as well as the actuator characteristics to determine the actual effect the actuator is capable of playing. The pre-processed effect is either the same or a scaled down version of the original effect. The pre-processing changes the haptic effects to what is achievable even before they are played.

The post-processing looks at the current state of the actuator as well as the desired effect force, to come up with a new force. This new force might be the same as the desired force or it might be a force which will get the actuator to the desired force as soon as possible. As a result of the pre-processing and the post-processing, either implemented together in one embodiment, or implemented individually in other embodiments (i.e., one embodiment implements only pre-processing, and another embodiment implements only post-processing), cascading from a series of quick haptic effects, such as consecutive keypad presses, is minimized or eliminated.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of generating haptic effects on a device having an actuator, the method comprising:
    receiving a pre-defined haptic effect definition that defines haptic effect parameters of a pre-defined haptic effect;
    determining that the actuator is unable to play the pre-defined haptic effect, the determining comprising determining one or more characteristics of the actuator within the device;
    revising the pre-defined haptic effect definition based on the characteristics to generate a processed haptic effect definition; and
    applying the processed haptic effect definition to the actuator.

2. The method of claim 1, wherein the characteristics comprise at least one of a rise time of the actuator or a fall time of the actuator.

3. The method of claim 1, wherein the haptic effect parameters comprise duration, frequency and magnitude.

4. The method of claim 1, wherein the pre-defined haptic effect definition defines an envelope of a magnitude of the pre-defined haptic effect.

5. The method of claim 4, wherein the revising comprises scaling down a magnitude of the pre-defined haptic effect while maintaining the envelope.

6. The method of claim 5, wherein the envelope comprises sections comprising a plurality of magnitude regions comprising an impulse magnitude region, a sustain magnitude region and a fade magnitude region, and the scaling down comprises:
    determining an original maximum magnitude of each of the magnitude regions;
    determining among each of the original maximum magnitudes, an achievable maximum magnitude based on where a rise curve of the actuator intersects curves of the pre-defined haptic effect; and
    generating a scale factor comprising a ratio of the achievable maximum magnitude and the original maximum magnitude.

7. The method of claim 1, wherein the revising comprises scaling down a magnitude of the pre-defined haptic effect.

8. The method of claim 1, wherein the revising comprises scaling down a duration of the pre-defined haptic effect.

9. A haptically enabled system comprising:
    a processor; and
    an actuator coupled to the processor;
    wherein the processor:
    receives a pre-defined haptic effect definition that defines haptic effect parameters of a pre-defined haptic effect;
    determines that the actuator is unable to play the pre-defined haptic effect, the determines comprising determining one or more characteristics of the actuator within the system;
    revises the pre-defined haptic effect definition based on the characteristics to generate a processed haptic effect definition; and
    applies the processed haptic effect definition to the actuator.

10. The haptically enabled system of claim 9, wherein the characteristics comprise at least one of a rise time of the actuator or a fall time of the actuator.

11. The haptically enabled system of claim 9, wherein the haptic effect parameters comprise duration, frequency and magnitude.

12. The haptically enabled system of claim 9, wherein the pre-defined haptic effect definition defines an envelope of a magnitude of the pre-defined haptic effect.

13. The haptically enabled system of claim 12, wherein the revises comprises scaling down a magnitude of the pre-defined haptic effect while maintaining the envelope.

14. The haptically enabled system of claim 13, wherein the envelope comprises sections comprising a plurality of magnitude regions comprising an impulse magnitude region, a sustain magnitude region and a fade magnitude region, and the scaling down comprises:
    determining an original maximum magnitude of each of the magnitude regions;
    determining among each of the original maximum magnitudes, an achievable maximum magnitude based on where a rise curve of the actuator intersects curves of the pre-defined haptic effect; and
    generating a scale factor comprising a ratio of the achievable maximum magnitude and the original maximum magnitude.

15. The haptically enabled system of claim 9, wherein the revises comprises scaling down a magnitude of the pre-defined haptic effect.

16. The haptically enabled system of claim 9, wherein the revises comprises scaling down a duration of the pre-defined haptic effect.

17. A non-transitory computer-readable medium having instructions stored thereon that, when executed by a processor, cause the processor to generate haptic effects on a device having an actuator, comprising:
    receiving a pre-defined haptic effect definition that defines haptic effect parameters of a pre-defined haptic effect;
    determining that the actuator is unable to play the pre-defined haptic effect, the determining comprising determining one or more characteristics of the actuator within the device;
    revising the pre-defined haptic effect definition based on the characteristics to generate a processed haptic effect definition; and
    applying the processed haptic effect definition to the actuator.

18. The non-transitory computer-readable medium of claim 17, wherein the characteristics comprise at least one of a rise time of the actuator or a fall time of the actuator.

19. The non-transitory computer-readable medium of claim 17, wherein the haptic effect parameters comprise duration, frequency and magnitude.

20. The non-transitory computer-readable medium of claim 17, wherein the revising comprises scaling down a magnitude of the pre-defined haptic effect or scaling down a duration of the pre-defined haptic effect.

\* \* \* \* \*